United States Patent
Jain et al.

(10) Patent No.: US 9,296,896 B2
(45) Date of Patent: Mar. 29, 2016

(54) POLYAMIDES WITH NANOPARTICLES ON THE SURFACE

(75) Inventors: Sachin Jain, Jalgaon (IN); Shankara Narayanan Keelapandal Ramamoorthy, Mannheim (DE)

(73) Assignee: BASF SE, Ludwigshafen (DE)

(*) Notice: Subject to any disclaimer, the term of this patent is extended or adjusted under 35 U.S.C. 154(b) by 129 days.

(21) Appl. No.: 13/302,630

(22) Filed: Nov. 22, 2011

(65) Prior Publication Data

US 2012/0128877 A1 May 24, 2012

Related U.S. Application Data

(60) Provisional application No. 61/416,319, filed on Nov. 23, 2010.

(51) Int. Cl.
| | |
|---|---|
| B05D 1/02 | (2006.01) |
| C08L 77/02 | (2006.01) |
| C08J 3/12 | (2006.01) |
| C08J 3/20 | (2006.01) |
| C08L 77/06 | (2006.01) |
| C08K 3/36 | (2006.01) |

(52) U.S. Cl.
CPC .............. *C08L 77/02* (2013.01); *C08J 3/126* (2013.01); *C08J 3/128* (2013.01); *C08J 3/203* (2013.01); *C08L 77/06* (2013.01); *C08J 2377/00* (2013.01); *C08J 2469/00* (2013.01); *C08J 2479/02* (2013.01); *C08K 3/36* (2013.01)

(58) Field of Classification Search
CPC   B05B 15/1229; B05B 12/1418; B05B 5/032; B05B 5/1683; B05B 7/0408
USPC ................. 427/212, 215, 213, 222; 264/12, 5
See application file for complete search history.

(56) References Cited

U.S. PATENT DOCUMENTS

| | | | |
|---|---|---|---|
| 2,071,250 A | 2/1937 | Carothers | |
| 2,071,251 A | 2/1937 | Carothers | |
| 2,130,523 A | 9/1938 | Carothers | |
| 2,130,948 A | 9/1938 | Carothers | |
| 2,241,322 A | 5/1941 | Hanford | |
| 2,312,966 A | 3/1943 | Hanford | |
| 2,512,606 A | 6/1950 | Bolton et al. | |
| 3,393,210 A | 7/1968 | Speck | |
| 4,123,570 A * | 10/1978 | Van Hijfte et al. | 427/222 |
| 4,144,123 A | 3/1979 | Scharf et al. | |
| 4,371,674 A | 2/1983 | Hertel et al. | |
| 4,537,949 A | 8/1985 | Schmidt et al. | |
| 4,540,772 A | 9/1985 | Pipper et al. | |
| 4,704,330 A * | 11/1987 | Moore et al. | 428/407 |
| 5,496,887 A | 3/1996 | Braune | |
| 5,536,370 A | 7/1996 | Scherr et al. | |
| 5,641,855 A | 6/1997 | Scherr et al. | |
| 6,056,967 A | 5/2000 | Steuerle et al. | |
| 6,063,286 A | 5/2000 | Steuerle et al. | |
| 6,150,478 A * | 11/2000 | Ramamurthy et al. | 526/88 |
| 6,616,968 B2 * | 9/2003 | Bostrom et al. | 427/212 |
| 6,706,190 B1 | 3/2004 | Steuerle et al. | |
| 7,884,153 B2 * | 2/2011 | Ventelon et al. | 524/492 |
| 2008/0200331 A1 * | 8/2008 | Daniel et al. | 502/402 |
| 2008/0305420 A1 * | 12/2008 | Kinoshita | B01J 2/16 430/97 |
| 2009/0012486 A1 * | 1/2009 | Riegel et al. | 604/358 |
| 2010/0234631 A1 | 9/2010 | Misske et al. | |
| 2010/0291389 A1 | 11/2010 | Sharavanan et al. | |
| 2011/0021686 A1 | 1/2011 | Jain et al. | |
| 2011/0021687 A1 | 1/2011 | Jain et al. | |
| 2013/0101852 A1 | 4/2013 | Dhodapkar et al. | |

FOREIGN PATENT DOCUMENTS

| | | |
|---|---|---|
| DE | 4401055 A1 | 7/1995 |
| DE | 19931720 A1 | 1/2001 |
| EP | 25515 A1 | 3/1981 |
| EP | 0038094 A2 | 10/1981 |
| EP | 0038582 A2 | 10/1981 |
| EP | 0039524 A1 | 11/1981 |
| EP | 129195 A2 | 12/1984 |
| EP | 129196 A2 | 12/1984 |
| EP | 299444 | 7/1988 |
| EP | 675914 A1 | 10/1995 |
| EP | 873371 A1 | 10/1998 |
| EP | 895521 A1 | 2/1999 |
| EP | 1177035 A1 | 2/2002 |
| JP | 2002-036267 A | 2/2002 |
| JP | 2009-522387 A | 6/2009 |
| JP | 2011-510145 A | 3/2011 |
| JP | 2013-530284 A | 7/2013 |
| NL | 7007122 A | 11/1971 |
| WO | WO-94/12560 | 6/1994 |
| WO | WO-2004/074360 A2 | 9/2004 |
| WO | WO-2007059767 A1 | 5/2007 |
| WO | WO-2007/074108 A1 | 7/2007 |

(Continued)

OTHER PUBLICATIONS

Polymer Technoloy & Services, LLC, "A Guide to Polycarbonate in General", 2012.*

(Continued)

*Primary Examiner* — Erma Cameron

(74) *Attorney, Agent, or Firm* — Drinker Biddle & Reath LLP

(57) ABSTRACT

Process for producing polymer mixtures comprising at least one polymer (A) and comprising at least one component (B), comprising the following steps:

(a) providing (A) in the form of granules, (b) providing (B) in the form of liquid solution and/or dispersion in a dispersion medium, (c) by means of an atomizer, applying droplets of the solution and/or dispersion provided in step (b) to the granules provided in step (a), (d) drying the granules obtained in step (c), and (e) optionally carrying out one or more shaping steps.

22 Claims, No Drawings

(56) References Cited

FOREIGN PATENT DOCUMENTS

| WO | WO-2008/084021 | A1 | 7/2008 |
|---|---|---|---|
| WO | WO-2009092698 | A1 | 7/2009 |
| WO | WO-2009/115535 | A2 | 9/2009 |
| WO | WO-2009/115536 | A1 | 9/2009 |
| WO | WO-2010/054933 | A1 | 5/2010 |
| WO | 2010090979 | * | 8/2010 |
| WO | WO-2011/000816 | A1 | 1/2011 |
| WO | WO-2011/009798 | A1 | 1/2011 |
| WO | PCT/EP2011/063842 | | 8/2011 |
| WO | PCT/EP2011/064932 | | 8/2011 |
| WO | WO-2012069340 | A1 | 5/2012 |

OTHER PUBLICATIONS

Dunlap et al., "Surface Tension of Aqueous Solutions of Potassium Hydroxide", Nature, vol. 196, Dec. 29, 1962, pp. 1312-1313.*
Data Physics Instruments, "Surface Tension Values of Some Common Test Liquids for Surface Energy Analysis", Nov. 24, 2006.*
AkzoNobe,I ("Bindzil and Levasil Colloidal Silica—Aqueous Dispersions of Colloidal Silica") pp. 1-12, 2014.*
Definition of "granule", p. 532 of Webster's Ninth New Collegiate Dictionary, 1983.*
U.S. Appl. No. 13/212,566, filed Aug. 11, 2011, Jain at al.
U.S. Appl. No. 13/226,568, filed Sep. 7, 2011, Grützner et al.
English language equivalent/abstract of Office Action for Chinese Patent Application No. 201180065631.6.
People's Medical Publishing House, "Inductively coules plasmas in analytical atomic spectrometry", Golightly, pp. 114-115, Jun. 1992. (not available, see Chinese Office Action).
Safety Data Sheet, Sigma-Aldrich, Version 5.4, Revision Date May 14, 2014.
English language equivalent of Office Action for Japanese Patent Application No. 2013-540299, Sep. 16, 2014.

* cited by examiner

POLYAMIDES WITH NANOPARTICLES ON THE SURFACE

This patent application claims the benefit of U.S. provisional patent application Ser. No. 61/416,319 filed on Nov. 23, 2010, incorporated in its entirety herein by reference.

The invention relates to a process for producing polymer mixtures comprising at least one polymer and comprising at least one further component, where a solution or liquid dispersion of the further component is applied by means of an atomizer to the polymer which is in the form of particles, and the polymer particles are then dried, and are usually further processed in shaping processes., The form in which polymers are used is usually not that of the pure substances but instead mostly a form mixed with further components. An example of a problem frequently encountered with thermoplastically processable polymers is that on the one hand polymers with high molecular weight are desirable in order to obtain better mechanical properties, but polymers with low molecular weight are easier to process; however, the mechanical properties of the resultant products are then poorer.

One approach to solving this problem is the use of nanoparticles to improve rheological and mechanical properties, for example as described in WO 2004/74360 A and WO 2008/064021 A.

However, incorporation of nanoparticles into a polymer with homogeneous dispersion of the nanoparticles in the polymer matrix is difficult, since the mixing of the nanoparticles with the polymer in the melt, for example in extruders or melt mixers, often leads to aggregation of the nanoparticles to give relatively large agglomerates during the mixing process, with a resultant reduction of the advantageous effect of the nanoparticles.

Another way of improving processability is the addition of hyperbranched polymers to the thermoplastic polymer. This improves flowability and in particular long-term properties, see by way of example WO 2010/054933, WO 2009/115535, and WO 2009/115536.

When organic compounds are used, thermal degradation of said compounds during the mixing process is a problem, and indeed volatile gases can sometimes be evolved. Thermal degradation reduces the amount of active compound in the polymer, and the degradation products can moreover be detrimental to the polymer, to the desired application, and/or to the processing systems used, for example if the degradation products are corrosive.

A SUMMARY OF THE INVENTION

It was an object of the present invention to provide a process which can produce mixtures of polymers with at least one further component while avoiding stress due to relatively high temperatures which promote undesired degradation reactions, but without impairing dispersion of the mixture constituents, for example rendering dispersion less homogeneous. In particular, the process is intended to permit production of mixtures of polymers with nanoparticles where the nanoparticles have maximum fineness of dispersion and formation of agglomerates of nanoparticles has been minimized.

The invention achieves said object via the following process for producing polymer mixtures comprising at least one polymer (A) and comprising at least one component (B), comprising the following steps:
(a) providing (A) in the form of granules,
(b) providing (B) in the form of liquid solution and/or dispersion in a dispersion medium,
(c) by means of an atomizer, applying droplets of the solution and/or dispersion provided in step (b) to the granules provided in step (a),
(d) drying the granules obtained in step (c), and
(e) optionally carrying out one or more shaping steps.

A DETAILED DESCRIPTION OF THE INVENTION

Application of the at least one further component (B) in the form of small droplets on the polymer granules, and subsequent removal of the dispersion medium, achieves uniform and very fine dispersion of component (B) on the polymer granules without any need to expose the polymer and component (B) to severe thermal stress. When polymers are used as component (B), this has, by way of example, a noticeable advantageous effect in mitigating the reduction of molecular weight of the polymers that usually occurs during mixing in the melt. When nanoparticles are mixed with a polymer by the process of the invention, there is a marked reduction in agglomeration of the nanoparticles, as shown by a comparison of polymer-nanoparticle mixtures which were produced by mixing in the melt and, respectively, produced in the invention, and in each case subsequently extruded.

When the at least one polymer used as (A) is selected from polymers which are produced via what is known as solid-state polycondensation, the process of the invention can be integrated particularly easily into the production process, in particular into the postcondensation step, where the precondensed polymer is kept for some time at temperatures below the glass transition temperature and melting point of the polymer, in order to increase the molecular weight of the polymer via further condensation reactions.

The invention will be described in detail below.

In step (a) of the process of the invention, at least one polymer (A) is provided in the form of granules. The at least one polymer (A) is therefore in particle form. The $D_{50}$ value of the granules is usually from 5 μm to 5 mm, preferably from 50 μm to 4 mm, particularly preferably from 100 μm to 2 mm, determined by means of sieving. In the invention, the diameter of a granule is the longest dimension of the particle. The granules can be used in any desired shape in the invention, for example being round, elliptical, cylindrical, etc., and they can have a regular or irregular shape, and a regular or irregular surface.

The at least one polymer (A) in the invention is preferably selected from thermoplastic polymers. For the purposes of the invention, "thermoplastic polymers", also called thermoplastics, are polymers which can be processed thermoplastically, i.e. polymers which are plastically deformable via heating. A feature of the thermoplastic polymers here is that they can be repeatedly plastically deformed via heating. In the invention, the term thermoplastic polymers also covers thermoplastic elastomers. In principle, the process of the invention can use thermoplastics of any type. A list of suitable thermoplastics can be found in Kunststoff-Taschenbuch [Plastics Handbook], ed. Saechtling, 1989. Processes for producing said thermoplastics are well-known, and many thermoplastics are commercially available. Examples of suitable thermoplastics are polyamides, polyesters, such as polybutylene terephthalate and polyethylene terephthalate, polyurethanes, polycarbonates, vinylaromatic polymers, such as polystyrenes, and also copolymers, and mixtures thereof.

It is particularly preferable in the invention that the at least one polymer (A) is selected from polymers which are producable by means of polycondensation. These are also termed polycondensates. Polycondensation means polymerization via a repeated condensation step with elimination of simple, i.e. low-molecular weight, compounds, for example water. Among the polycondensates most frequently used are polyamides, polyesters, and polycarbonates. Some high-performance polymers are also produced via polycondensation, examples being polyether ketones, polyether ether ketones, polyaryl ether ketones, polyimides, polysulfones, polyether sulfones, and polyphenylene sulfones, and polyphenylene sulfides.

Other suitable polymers are polyolefins, such as polyethylene homo- and copolymers, and/or polypropylene homo- or copolymers, polvinyl chlorides, poly(meth)acrylates, and mixtures of the thermoplastic polymers listed in this paragraph and above.

Some preferred thermoplastic polymers are described in more detail below.

1. Polyamides

The intrinsic viscosity (inherent viscosity, previously Staudinger index) of polyamides which are used in the process of the invention is usually from 90 to 350 ml/g, preferably from 110 to 240 ml/g, determined to ISO 307 in 0.5% by weight solution of the polymer in 96% sulfuric acid at 25° C.

Preference is given to use of semicrystalline or amorphous polymers with molar masses $M_w$ of at least 5000 g/mol, these being described by way of example in U.S. Pat. Nos. 2,071,250, 2,071.251, 2,130,523, 2,130,948, 2,241,322, 2,312,966, 2,512,606 and 3,393,210.

These documents describe by way of example polyamides which have been produced from 7- to 13-membered lactam rings, for example from polycaprolactam, polycaprylolactam, and polylaurolactam, and also describe polyamides which have been obtained via reaction of dicarboxylic acids with diamines, Examples of dicarboxylic acids that can be used are alkanedicarboxylic acids having from 6 to 12 carbon atoms, preferably having from 6 to 10 carbon atoms, and aromatic dicarboxylic acids. Among these are adipic acid, azelaic acid, sebacic acid, dodecanedioic acid, terephthalic acid, and/or isophthalic acid.

Particularly suitable diamines are alkanediamines having from 6 to 12 carbon atoms, preferably having from 6 to 8 carbon atoms, and also m-xylenediamine, di(4-aminophenyl)methane, di(4-aminocyclohexyl)methane, 2,2-di(4-aminophenyl)propane, or 2,2-di(4-aminocyclohexyl)propane.

Preferred polyamides are polyhexamethyleneadipamide, polyhexamethylenesebacamide, and polycaprolactam, and also nylon-6/6,6, in particular with from 5 to 95% by weight content of caprolactam units. Polycaprolactam (polyamide-6 or nylon-6) and polyhexamethyleneadipamide (polyamide-6,6 or nylon-6,6) are particularly preferred.

These compounds are commercially available by way of example with trademarks Ultramid® B and Ultramid® A from BASF SE.

Mention should also be made of polyamides which can be obtained by way of example via condensation of 1,4-diaminobutane with adipic acid at elevated temperatures (nylon-4,6). Production processes for polyamides having this structure are described by way of example in EP 38094A, EP 38582A, and EP 39524A. Other suitable polyamides can be obtained via copolymerization of two or more of the abovementioned monomers. Mixtures of more than one polyamide are likewise suitable, and the mixing ratio here can be adjusted as desired.

Other polyamides having particular advantages are semiaromatic copolyamides, such as nylon-6,6T and nylon-6,6/6,T, where these have less than 0.5% by weight triamine content, preferably less than 0.3% by weight, based on molecular weight (EP 299 444 A). Semiaromatic copolyamides with low triamine content can be produced via the processes described in EP 129 195 A and EP 129 196 A.

Other suitable polyamides comprise uncolored polyamides based on nylon-6,6 comprising suitable stabilizers, such as amines. These compounds are obtainable as Ultramid® AE products from BASF SE. Polyamides that are likewise suitable are glassfiber-reinforced mixtures based on nylon-6. Products of this type are commercially obtainable as Ultramid® BE from BASF SE.

2. Polyesters

Polyesters usually used are those based on aromatic dicarboxylic acids and on aliphatic and/or aromatic dihydroxy compounds.

A first group of preferred polyesters is that of polyalkylene terephthalates, where the alcohol moiety of these has from 2 to 10 carbon atoms.

Polyalkylene terephthalates of this type are known per se. Their main chain comprises an aromatic ring which derives from the aromatic dicarboxylic acid. The aromatic ring can have substitution, for example by halogen, such as chlorine or bromine, or by $C_1$-$C_4$-alkyl groups, such as methyl, ethyl, isopropyl or n-propyl, or n-, iso-, or tert-butyl groups.

These polyalkylene terephthalates can be obtained via reaction of aromatic dicarboxylic acids or their esters or ester-forming derivatives with aliphatic dihydroxy compounds in a known manner.

Preferred dicarboxylic acids are 2,6-naphthalenedicarboxylic acid, terephthalic acid, and isophthalic acid, or a mixture thereof. Up to 32 mol %, preferably no more than 10 mol %, of the aromatic dicarboxylic acids can be replaced by aliphatic or cycloaliphatic dicarboxylic acids, such as adipic acid, azelaic acid, sebacic acid, dodecanedioic acids, and cyclohexanedicarboxylic acid. The mol % data are based on the total molecular weight of the polymer.

Preferred aliphatic dihydroxy compounds are diols having from 2 to 8 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol, and neopentyl glycol, or a mixture thereof.

Particularly preferred polyesters are polyalkylene terephthalates obtained from alkanediols having from 2 to 6 carbon atoms. Among these, particular preference is given to polyethylene terephthalate, polypropylene terephthalate, and polybutylene terephthalate, and mixtures thereof. Preference is likewise given to PET. (polyethylene terephthalate), and/or PBT (polybutylene terephthalate), which comprise, as further monomer units, up to 1% by weight, preferably up to 0.75% by weight, of 1,6-hexanediol and/or 2-methyl-1,5-pentanediol. The data in percent by weight are based on the total weight of the polyalkylene terephthalate.

The intrinsic viscosity of the polyesters is usually in the range from 50 to 220, preferably from 80 to 160, determined in a 0.5% by weight solution of the polyester in a mixture made of phenol and o-dichlorobenzene in a ratio of 1:1 by weight at 25° C. to ISO 1628.

Particular preference is given to polyesters where content of terminal carboxy groups is up to 100 meq/kg of polyester, preferably up to 50 meq/kg of polyester, and in particular up to 40 meq/kg of polyester. Polyesters of this type can by way of example be produced by the process of DE 44 01 055 A. The content of terminal carboxy groups is usually determined via titration methods, for example by means of potentiometry.

Compositions suitable for the process of the invention also comprise mixtures of polyesters which differ from PBT, for example polyethylene terephthalate (PET) and/or polycarbonate. The ratio for example of the polyethylene terephthalate and/or of the polycarbonate in the mixture here is preferably up to 50% by weight, in particular from 10 to 30% by weight, based on 100% by weight of the total weight of (A).

Suitable polyesters for use in the process of the invention also comprise biodegradable polyesters, such as random aliphatic-aromatic copolyesters based on, for example, adipic acid, succinic acid, sebacic acid, 1,4-butanediol and 1,3-butanediol. These products are biodegradable, and their monomers can also be obtained from renewable sources. Biodegradable polyesters are obtainable by way of example with trademark Ecoflex® from BASF SE.

It is also advantageous to use recycling materials, an example being PET, optionally in a mixture with other polyalkylene terephthalates, such as PBT.

The recycled materials can be used either in pelletized form or in the form of ground material. Polyesters are subject to hydrolytic cleavage caused by traces of moisture during processing, and it is therefore advisable to predry the recycled material. Residual moisture content after drying is preferably from 0.01 to 0.7%, in particular from 0.2 to 0.6%, based on the total weight of the polyester.

Another suitable group of polyesters is that of fully aromatic polyesters which are produced from aromatic dicarboxylic acids and from aromatic dihydroxy compounds.

Suitable aromatic dicarboxylic acids are the compounds listed above for producing polyalkylene terephthalates. It is preferable to use mixtures made of from 5 to 100 mol % of isophthalic acid and from 0 to 95 mol % of terephthalic acid, in particular from 50 to 80 mol % of terephthalic acid and to use from 20 to 50 mol % of isophthalic acid, based on the mixture.

3. Polycarbonates

The at least one polymer (A) used can comprise homopolycarbonates or copolycarbonates. It is preferable to use homo- and copolycarbonates using bisphenol A. Suitable polycarbonates can have branching in a known manner, for example via incorporation of from 0.05 to 2.0 mol %, based on the total amount of bisphenol, of an at least trifunctional compound, for example a compound having three or more phenolic OH groups.

Molar masses $M_w$ (mass average) of preferred polycarbonates are from 10 000 to 200 000 g/mol, preferably from 20 000 to 80 000 g/mol.

The polycarbonates can by way of example be produced via reaction of diphenols with phosgene at an interface, or with phosgene in a homogeneous phase (known as pyridine process), and in each case the desired molecular weight can be achieved in a known manner via use of a suitable amount of a chain terminator.

The invention gives particular preference to polyamides, in particular nylon-6,6 and nylon-6. These polyamides are commercially obtainable by way of example with trademark Ultramid® from BASF SE. The invention likewise prefers polyesters, in particular polybutylene terephthalates (PBT). PBTs of this type are obtainable with trademark Ultradur® from BASF SE. Polycarbonates are likewise particularly preferred. Preference is further given to copolymers comprising polyamide, polyester, and/or polycarbonate, and mixtures thereof. It is particularly preferable that the at least one polymer (A) has been selected from the group consisting of polyamides, polyesters, polycarbonates, copolymers comprising polyamide, polyester, and/or polycarbonate, and mixtures made of said homopolymers and/or copolymers.

The polymer mixtures that can be produced by the process of the invention usually comprise from 1 to 99.9% by weight of at least one polymer (A), preferably from 5 to 99.9% by weight, and particularly preferably from 8 to 99.9% by weight, of at least one polymer (A), based on the total weight of the polymer mixture. It is possible to use one, two, or more polymers as (A). If two or more polymers are used as (A), step (a) can Use a mixture made of granules of the two or more polymers, but it is also possible to begin by producing mixed granules made of the two or more polymers and comprising a mixture made of two or more polymers, for example via extrusion of the materials together. Mixed granules and granules made of one polymer can also be used together.

The content of the at least one further component (B) in the polymer mixture is usually from 0.1 to 99% by weight, preferably from 0.1 to 95% by weight, and with particular preference from 0.1 to 92% by weight, based on the total weight of the polymer mixture. The amount of the at least one polymer (A) in the polymer mixtures of the invention is usually from 1 to 99.9% by weight, preferably from 5 to 99.9% by weight, and with particular preference from 8 to 99.9% by weight, based on the total weight of the polymer mixtures.

The abovementioned concentration ranges here comprise the polymer mixtures in the narrower sense and also what are known as masterbatches in the form of intermediate products in which component (B) is provided at much higher concentration in (A).

The polymer mixture usually comprises from 50 to 99.9% by weight of at least one polymer (A) and from 0,1 to 50% by weight of component (B), preferably from 90 to 99.9% by weight of at least one polymer (A) and from 0.1 to 10% by weight of component (B), and the polymer mixture particularly preferably comprises from 95 to 99.9% by weight of at least one polymer (A) and from 0.1 to 5% by weight of component (B), based in each case on the total weight of the polymer mixture.

In principle, component (B) used can comprise any of the compounds and substances which can be sprayed in suitable form, for example in the form of solution, of colloid, of dispersion, of suspension, or of emulsion. Among these are low-molecular weight organic and inorganic compounds, relatively high-molecular-weight organic compounds; such as polymers, and relatively high-molecular weight inorganic compounds, such as silica sols, etc. It is moreover possible to apply organic and inorganic nanoparticles by the process of the invention. Organic nanoparticles are by way of example polymer latices, and inorganic nanoparticles can by way of example be fine-particle metal oxides.

The invention preferably selects the at least one component (B) from nanoparticles and/or polymers.

The number-average particle diameter (also termed particle size) ($D_{50}$ value) of the nanoparticles is usually from 1 to 500 nm, preferably from 1 to 250 nm, more preferably from 1 to 100 nm, particularly preferably from 1 to 50 nm, and with particular preference from 1 to 20 nm. The average particle size and the particle size distribution can be determined via dynamic light scattering, an ultracentrifuge (particularly suitable for determining the average particle diameter of colloidal solutions), field flow fractionation, or electomicroscopy (TEM and/or SEM). It is possible here to use nanoparticles with narrow, or else broad, particle size distribution.

The length (greatest dimension of the nanoparticle) to diameter (smallest dimension of the nanoparticle) ratio of the nanoparticles is preferably from 1 to 50, preferably from 1 to 20, particularly preferably from 1 to 5, and in particular from 1 to 3.

In principle, any of the materials known to the person skilled in the art as nanoparticles can be used as at least one further component (B). Among these are carbon-containing nanoparticles, such as fullerenes, carbon nanotubes, and carbon black, oxides and oxide hydrates of metals and of semimetals, and metals and metal sulfides.

Processes for producing nanoparticles are known in principle to the person skilled in the art. Nanoparticles can be obtained by means of mechanicophysical processes from microparticles, using the top-down strategy, and this method is used by way of example in producing metallic and ceramic nanoparticles. Here, microparticles are comminuted for example via grinding in high-energy ball mills or by means of reactive grinding. Chemicophysical production processes follow the bottom-up strategy, which constructs more complex structures in a controlled manner from atoms or from molecules, optionally with use of atomic/molecular self-organization mechanisms. Among these are by way of example the sol-gel process carried out in a liquid phase, hydrothermal processes, and precipitation processes, and also processes carried out in the gas phase, e.g. plasma processes, flame hydrolysis, and spray pyrolysis. There is also a wide variety of nanoparticles obtainable commercially for example in the form of colloidal solutions (sols).

Processes for producing sols are known to the person skilled in the art and are described by way of example in Iler, Ralph K. "The Chemistry of Silica", chapter 4: "Colloidal Silica Concentrated Sols", John Wiley & Sons, New York, 1979, ISBN:0-471-02404-X, pages 331-343.

Sol-gel processes for producing oxides and/or oxide hydrates of metals and/or semimetals are likewise known to the person skilled in the art. Sol-gel processes of this type are described by way of example in Sanchez et al., Chemistry of Materials 2001, 13, 3061-3083.

It is preferable in the invention that the nanoparticles are selected from the oxides and oxide hydrates of metals and semimetals, in particular from the oxides and oxide hydrates of Si, Ti, Fe, Ba, Zr, Zn, Al, Ga, In, Sb, Bi, Cu, Ge, Hf, La, Li, Nb, Na, Ta, Y, Mo, V, Sn, and mixtures thereof. It is particularly preferable that the nanoparticles are selected from the oxides and oxide hydrates of Si, Ti, and Ba, in particular of Si, The polymers used as at least one further component (B) can be provided in the form of solutions, but they can also take the form of nanoparticles, for example produced by means of emulsion polymerization or microemulsion polymerization. The latter statements apply in particular to crosslinked polymers. The invention preferably uses branched and/or hyperbranched polymers as at least one further component (B). It is further preferable that the polymers used as (B) are selected from polyethyleneimines, polyetheramines, and mixtures thereof.

For the purposes of the present invention, the "hyperbranched" feature means that the degree of branching DB of the relevant polymers, defined as DB (%)=100×(T+Z)/(T+Z+L), where T is the average number of terminally bonded monomer units, Z is the average number of monomer units forming branching points, and. L is the average number of linearly bonded monomer units in the macromolecules of the respective polymers, is from 10 to 98%, preferably from 25 to 90%, and particularly preferably from 30 to 80%.

For the purposes of the present invention it is particularly preferable to use high-functionality hyperbranched polyethyleneimines, hyperbranched polyetheramines, and mixtures thereof as at least one further component (B).

For the purposes of this invention, a high-functionality hyperbranched polyethyleneimine is a product which also has, alongside secondary and tertiary amino groups, where these form the polymer skeleton, an average of at least three, preferably at least six, with particular preference at least ten, terminal or pendant functional groups. The functional groups are preferably primary amino groups. The number of terminal or pendant functional groups is not in principle subject to any upper restriction, but products with a very large number of functional groups can have undesired properties, such as high viscosity or poor solubility. The high-functionality hyperbranched polyethyleneimines of the present invention preferably have no more than 500 terminal or pendant functional groups, in particular no more than 100 terminal or pendant groups.

For the purposes of the present invention, polyethyleneimines are either homo- or copolymers which are obtainable by way of example by the processes in Ullmann's Encyclopedia of Industrial Chemistry, "Aziridines", electronic release (article published on Dec. 15, 2006), or as In WO-A 94/12560.

The homopolymers are preferably obtainable via polymerization of ethyleneimine (aziridine) in aqueous or organic solution in the presence of Lewis acids or other acids, or of compounds which cleave to give acids. Homopolymers of this type are branched polymers which generally comprise primary, secondary, and tertiary amino groups in a ratio of about 30%:40%:30%. The distribution of the amino groups can be determined by means of $^{13}C$ NMR spectroscopy.

Comonomers used preferably comprise compounds which have at least two amino functions. Suitable comonomers that may be mentioned are by way of example alkylenediamines having from 2 to 10 carbon atoms in the alkylene moiety, preference being given here to ethylenediamine and propylenediamine. Further suitable comonomers are diethylenetriamine, triethylenetetramine, tetraethylenepentamine, dipropylenetriamine, tripropylenetriamine, dihexamethylenetriamine, aminopropylethylenediamine, and bisaminopropylethylenediamine.

The average molar mass (weight average) of polyethyleneimines is usually in the range from 100 to 3 000 000 g/mol, in particular from 800 to 2 000 000 g/mol.

The weight-average molar mass here of the polyethyleneimines obtained via catalyzed polymerization of aziridines is usually in the range from 800 to 50 000 g/mol, in particular from 1 000 to 30 000 g/mol. Polyethyleneimines of relatively high molecular weight can in particular be obtained via reaction of the polyethyleneimines mentioned with difunctional alkylation compounds, such as chloromethyloxirane or 1,2-dichloro-ethane, or via ultrafiltration of polymers with a broad molecular weight distribution, as described by way of example in EP-A 873371 and EP-A 1177035, or via crosslinking.

Other materials suitable as component (B) are crosslinked polyethyleneimines, where these are obtainable via reaction of polyethyleneimines with bi- or polyfunctional crosslinking agents, where these have at least one halohydrin unit, glycidyl unit, aziridine unit, or Isocyanate unit, or one halogen atom, as functional group. An example that may be mentioned is epichlorohydrin, or bischlorohydrin ethers of polyalkylene glycols having from 2 to 100 units of ethylene oxide and/or of propylene oxide, and also the compounds listed in DE-A 19 93 17 20 and U.S. Pat. No. 4,144,123. Processes for producing crosslinked polyethyleneimines are known inter alia from the abovementioned specifications, and also EP-A 895 521 and EP-A 25 515. The average molar mass of crosslinked polyethyleneimines is usually more than 20 000 g/mol.

Other materials that can be used as component (B) are grafted polyethyleneimines, where any compounds capable of reaction with the amino or imino groups of the polyethyleneimines can be used as grafting agents. Suitable grafting agents and processes for producing grafted polyethyleneimines are found by way of example in EP-A 675 914.

Amidated polymers are likewise suitable polyethyleneimines, and are usually obtainable via reaction of polyethyleneimines with carboxylic acids, or their esters or anhydrides, carboxamides, or acyl halides. The amidated polymers can subsequently be crosslinked with the crosslinking agents mentioned to an extent that depends on the content of the amidated nitrogen atoms in the polyethyleneimine chain. It is preferable that up to 30% of the amino functions here are amidated, in order that there is a sufficient number of primary and/or secondary nitrogen atoms still available for a subsequent crosslinking reaction.

Alkoxylated polyethyleneimines are also suitable, and these are obtainable by way of example via reaction of polyethyleneimine with ethylene oxide and/or propylene oxide, and/or butylene oxide. Again, alkoxylated polymers of this type can be subsequently crosslinked.

Other polyethyleneimines that are suitable as component (B) and that may be mentioned are hydroxylated polyethyleneimines and amphoteric polyethylenelmines (incorporation of anionic groups), and also lipophilic polyethyleneimines, where these are generally obtained via incorporation of long-chain hydrocarbon moieties into the polymer chain. Processes for producing polyethyleneimines of this type are known to the person skilled in the art, and further details in this connection would therefore be superfluous.

The weight-average molar mass, determined via light scattering, of the polyethyleneimines used as component (B) is preferably from 800 to 50 000 g/mol, particularly preferably from 1000 to 40 000 g/mol, in particular from 1200 to 30 000 g/mol. The average molar mass (weight average) is preferably determined by means of gel permeation chromatography using pullulan as standard in an aqueous solution (water; 0.02 mol/l of formic acid; 0.2 mol/l of KCl).

It is advantageous that the amine number of the polyethyleneimines used as component (B) to DIN 53176 is in the range from 50 to 1000 mg KOH/g. The amine number of the polyethyleneimine used as component (B) is preferably from 100 to 900 mg KOH/g to DIN 53176, very preferably from 150 to 800 mg KOH/g.

For the purposes of this invention, a high-functionality hyperbranched polyetheramine is a polymer which also has, alongside the ether groups and the amino groups, where these form the polymer skeleton, an average of at least three, preferably at least six, with particular preference at least ten, terminal or pendant functional groups. The functional groups are preferably OH groups. The number of terminal or pendant functional groups is in principle not subject to any upper restriction, but products having a very large number of functional groups can have undesired properties, for example high viscosity or poor solubility. The high-functionality hyperbranched polyetheramine polyols of the present invention preferably have no more than 500 terminal or pendant functional groups, in particular no more than 100 terminal or pendant groups.

Polyetheramines are obtainable via reaction of
at least one tertiary amine having functional hydroxy groups, in particular at least one di-, tri-, or tetraalkanolamine, optionally in the presence of
secondary amines, where these bear hydroxy groups as substituent, in particular dialkanolamines, and/or optionally in the presence of
polyether polyols of functionality two or higher,
where the reaction is preferably carried out in the presence of a transetherification catalyst and etherification catalyst.

A more preferred embodiment of the polymers used as component (B) is moreover obtainable by further reacting ethylene oxide and/or propylene oxide and/or butylene oxide with the polyetheramines obtainable as mentioned above, and in particular these are polyethyleneimines having an inner polyethylene oxide block and having an outer polypropylene oxide block, as described in the European patent application with file reference no. 07120395.4, and also alkoxylated polyethylenimines as described in the European patent application with file reference no. 07120393.9.

The polyether amine used as component (B) preferably has on average at least 3 functional OH groups per molecule, i.e. the average OH functionality is at least 3. It is particularly preferable that the polyetheramine used as component (B) is obtainable via reaction of at least one trialkanolamine, optionally with dialkanolamines, and/or optionally with polyetherols of functionality two or higher.

After the reaction, i.e. without further modification, the hyperbranched polyetheramines (B) have terminal hydroxy groups. They have good solubility in various solvents.

Examples of these solvents are aromatic and/or (cyclo) aliphatic hydrocarbons and mixtures of these, and other examples are halogenated hydrocarbons, ketones, esters, and ethers.

An advantageous OH number determined to DIN 53240 for the polyetheramines used as component (B) is in the range from 50 to 1000 mg KOH/g. The OH number of component (B) is preferably from 100 to 900 mg KOH/g to DIN 53240, very preferably from 150 to 800 mg KOH/g.

The weight-average molar mass $M_w$ of the polyetheramines used as component (B) is mostly from 1000 to 500 000 g/mol, preferably from 2000 to 300 000 g/mol, and the number-average molar mass $M_n$ is mostly from 500 to 50 000 g/mol, preferably from 1000 to 40 000 g/mol, measured by means of gel permeation chromatography (GPC) using hexafluoroisopropanol as mobile phase and polymethyl methacrylate (PMMA) as standard.

In step (b) of the process of the invention, the at least one further component (B) is provided in the form of a liquid solution and/or dispersion in a dispersion medium. The dispersion medium here is usually likewise liquid.

For the purposes of the present invention, liquid means that the solution/dispersion or, respectively, the dispersion medium is flowable and can be comminuted to give small droplets with the aid of the selected atomizer. For the purposes of the present invention, dispersions are multiphase mixtures with at least one liquid phase and with at least one further liquid and/or solid phase, examples being emulsions and suspensions. For the purposes of the present invention, a suspension is a dispersion of solid particles in a liquid phase, in particular suspensions of nanoparticles or of particulate polymers. In the invention, emulsions are multiphase mixtures with at least two liquid phases.

The dispersion medium is usually selected from solvents and solvent mixtures, for example from water, aliphatic $C_1$-$C_6$ alcohols, optionally alkylated aromatic hydrocarbons (cyclo)aliphatic hydrocarbons, alkyl alkanoates, ketones, alkoxylated alkyl alkanoates, halogenated hydrocarbons, and mixtures thereof.

Particular preference is given to mono- or polyalkylated benzenes and naphthalenes, ketones, alkyl alkanoates, and alkoxylated alkyl alkanoates, and also mixtures of these.

Preferred aromatic hydrocarbon mixtures are those which comprise predominantly aromatic $C_7$-$C_{14}$ hydrocarbons and which can comprise a boiling range from 110 to 300° C., particular preference being given to toluene, o-, m-, or p-xylene, trimethylbenzene isomers, tetramethylbenzene isomers, ethylbenzene, cumene, tetrahydronaphthalene, and mixtures comprising these.

Examples here are the Solvesso® products from Exxon-Mobil Chemical, particularly Solvesso® 100 CAS No. 64742-95-6, predominantly $C_9$- and $C_{10}$-aromatics, boiling range about 154-178° C.), 150 (boiling range about 182-207° C.) and 200 (CAS No. 64742-94-5), and also the Shellsol® products from Shell. Hydrocarbon mixtures based on paraffins, on cycloparaffins, and on aromatics are also obtainable commercially as crystal oil (e.g. crystal oil 30, boiling range about 158-198° C. or crystal oil 60: CAS No. 64742-82-1), white spirit (e.g., likewise CAS No. 64747-82-1) or solvent naphtha (light: boiling range about 155-180° C., heavy: boiling range about)225-300°. The aromatic content of these hydrocarbon mixtures is generally more than 90% by weight, preferably more than 95% by weight, particularly preferably more than 98% by weight, and very particularly preferably more than 99% by weight. It can be advantageous to use hydrocarbon mixtures with particularly reduced content of naphthalene.

Examples of halogenated hydrocarbons are chlorobenzene and dichlorobenzene, and dichlorobenzene isomer mixtures.

Examples of esters are n-butyl acetate, ethyl acetate, 1-methoxypropyl 2-acetate, and 2-methoxyethyl acetate.

Examples of ethers are THF, dioxane, and also the dimethyl, diethyl, or di-n-butyl ethers of ethylene glycol, diethylene glycol, triethylene glycol, propylene glycol, dipropylene glycol, or tripropylene glycol.

Examples of ketones are acetone, 2-butanone, 2-pentanone, 3-pentanone, hexanone, isobutyl methyl ketone, heptanone, cyclopentanone, cyclohexanone, and cycloheptanone.

Examples of (cyclo)aliphatic hydrocarbons are decalin, alkylated decalin, and isomer mixtures of straight-chain or branched alkanes, and/or of cycloalkynes.

Preference is further given to n-butyl acetate, ethyl acetate, 1-methoxy-2-propyl acetate, 2-methoxyethyl acetate, 2-butanone, isobutyl methyl ketone, and also mixtures of these, in particular with the aromatic hydrocarbon mixtures listed above.

Mixtures of this type can be produced in a volume ratio of from 5:1 to 1:5, preferably in a volume ratio of from 4:1 to 1:4, particularly preferably in a volume ratio of from 3:1 to 1:3, and very particularly preferably in a volume ratio of from 2:1 to 1:2.

Preferred solvents are butyl acetate, methoxypropyl acetate, isobutyl methyl ketone, 2-butanone, Solvesso® products, and xylene.

Examples of other solvents which can be suitable for the polyetheramines are water, alcohols, such as methanol, ethanol, butanol, alcohol/water mixtures, acetone, 2-butanone, dimethylformamide, dimethylacetamide, N-methylpyrrolidone, M-ethylpyrrolidone, ethylene carbonate, and propylene carbonate.

The solution and/or dispersion provided in step (b) and used in step (c) and comprising the at least one further component (B) usually comprises from 1 to 50% by weight of at least one further component (B), preferably from 5 to 50% by weight, and particularly preferably from 5 to 30% by weight, based on the total weight of the solution/dispersion used. The solution/dispersion can comprise one, two, or more components (B).

In step (c) of the process of the invention, a solution and/or dispersion of at least one component (B) is applied in the form of very fine droplets onto the at least one polymer (A) taking the form of granules. The droplets produced via atomization are deposited on the surface of the granules, and the at least one component (B) comprised by way of example in the form of nanoparticles in the droplets is applied in the dispersed state to the granules. The preferably liquid dispersion medium used to produce the dispersion and/or solution of (B) is then removed, usually via drying of the granules. Further homogenization of the mixture comprising (A) and (B) can be achieved via subsequent mixing in the melt of the granules coated with (B). In particular, polymer nanocomposites (mixtures made of polymer and nanoparticle) can thus be produced with a markedly lower level of agglomerated nanoparticles, where these can have better rheological, mechanical, and thermal properties.

Atomizers that can be used are the usual apparatuses known to the person skilled in the art, e.g. pressurized single-fluid nozzles, among which are nozzles that generate turbulence and that form jets (hydraulic atomizers) and also nozzles that form lamellae, two-fluid atomizers with exterior or interior mixing (pneumatic atomizers), rotary atomizers, and ultrasound atomizers. An overview of atomization technology known to the person skilled in the art can be found by way of example in Perry's Chemical Engineers' Handbook, 8th edition, 2008, eds. D. W. Green and R. H. Perry, pages 14-93 to 14-95. It is preferable in the invention to use, in step (c), atomizers which produce droplets with average diameter of from 0.5 to 100 µm, preferably from 0.5 to 20 µm, particularly preferably from 0.5 to 10 µm, calculated from the particle size distribution determined by means of dynamic light scattering. By way of example, Spraytec equipment from Malvern can be used to carry out said determination, It is preferable to use, in step (c) of the invention, ultrasound atomizers, also known as ultrasound mist generators. Ultrasound atomizers are used in a very wide variety of sectors, for example as mist generators using water for humidification or for medical purposes in inhalers. Ultrasound systems suitable for the process of the invention are supplied by way of example by SONOSYS® Ultraschallsysteme GmbH, Neuenbürg (Germany). In the invention, ultrasound atomizers are devices which operate in a frequency range from 25 kHz to 5 MHz. In the invention, preference is given to operation of the ultrasound atomizer in step (c) in the frequency range from 750 kHz to 3 MHz. This is also termed the megasonic frequency range.

It is preferable in the invention to use dispersion media with surface tension of from 35 to 100 mN/m, determined at 25° C. Preference is likewise given to dispersion media with viscosity from 0,1 to 500 mPas, particularly preferably from 1 to 100 mPas, measured at the usage temperature, i.e. at the temperature prevailing during atomization. Examples of suitable dispersion media are water and mixtures of solvent(s) and water with surface tension from 35 to 100 mN/m, measured at 25° C. This approach is particularly preferred when an ultrasound atomizer is used, since it is particularly advantageous here to use, for the solution/dispersion of the at least one further component (B), dispersion media with viscosities and surface tensions similar to those of water.

Step (c) can be carried out in any of the apparatuses in which it is possible to achieve good distribution, onto the polymer taking the form of granules, of the droplet mist which is produced by the atomizer and which comprises the solution and/or suspension of (B), examples being columns. It is preferable in the invention that the granules take the form of fixed bed or fluidized bed in step (c). The fluidized bed can by way of example be produced by means of passage of an inert gas stream, where this simultaneously serves to dry the granules to which, in step (c), spray has been applied.

Step (c) can use a solution and/or dispersion comprising one, two or more of the at least one further component (B), but it is also possible to use more than one solution/dispersion in step (c), and by way of example it is possible to begin by applying a solution and/or dispersion of one further component (B), and then to apply a solution and/or dispersion of a second further component (B) to the granules, and so on.

Step (c) is usually continued until the desired amount of component (B) has been applied to the granules. This usually takes from 0.5 to 60 minutes.

It is preferable that the temperature at which step (c) is carried out is matched to the dispersion medium used for producing the solution and/or dispersion of (B), and this means that the liquid dispersion medium is intended to be readily removable at the temperatures prevailing in step (c), in particular to vaporize readily.

Step (c) in the invention is preferably carried out at temperatures of at least 10° C., preferably at least 20° C., and particularly preferably at least 30° C.

In step (d), the granules obtained in step (c) are dried. "Drying" in the invention means that the dispersion medium applied in step (c) with the solution and/or dispersion of (B) to the granules is removed. This can be achieved by way of example by means of passage of an inert gas stream. "Inert gas" in the invention means a gaseous substance or substance mixture which does not react either with the at least one polymer (A) or with the at least one component (B). There can be differences here, depending on the selection of (A) and (B). An example of a suitable inert gas is $N_2$, He, or Ar, or else, if materials are resistant to oxygen, air.

The temperature of the inert gas stream here is preferably at least 20° C. and particularly preferably at least 100° C. The temperature of the inert gas stream used here is preferably below the decomposition temperature or, respectively, the glass transition temperature or melting point of the at least one component (B), and also of the at least one polymer (A).

Step (d) can be followed by step (e), in which one or more shaping steps is/are optionally carried out. Shaping steps that can be carried out are any of the processes and further processes known to the person skilled in the art, for example mixing in the melt, extrusion, blow molding, injection molding, etc. The polymer mixtures produced by the process of the invention can also be further processed together with further polymers, and in particular they can serve as what are known as masterbatches for introducing component (B) into other polymers or polymer mixtures. The polymer mixtures produced by the process of the invention can be used to produce the articles known from plastics processing, e.g. fibers, foils, semifinished products, and moldings, e.g. household items, electronic components, medical devices, motor vehicle components, cases for electrical devices, cases for electronic components in motor vehicles, wheel surrounds, door paneling, tailgates, spoilers, intake manifolds, water tanks, and cases for electrical tools.

The process of the invention can be carried out continuously or batchwise,

Examples are used below to illustrate the invention.

EXAMPLE 1

Polyamide with Colloidal Silica (of the Invention)

Ultramid® B27E (BASF SE, polyamide with intrinsic viscosity IV=150 to ISO 307 prior to extrusion) is used as polyamide. Colloidal silica sol (Bindzil® CC/360 Eka Chemicals) with average particle diameter $D_{50}$ of 8 nm, calculated from the particle size distribution determined by means of dynamic light scattering, was used as nanoparticle.

The polyamide granules with average size from 0.5 to 2 nm were packed in a small (laboratory-scale) fixed bed. The dispersion of the colloidal silica sol (30% by weight in water) was atomized at a frequency of 1 MHz by an ultrasound atomizer (Sonosys megasonic atomizer with Slimline generator), and the fine droplet mist was passed over the fixed bed for from 2 to 5 minutes. A stream of nitrogen at 75° C. was simultaneously passed through the fixed bed in order to dry the granules. Once the atomization process had ended, the granules were dried for a further 5 minutes in the stream of nitrogen, and discharged as final product. The granules were then extruded at 280° C. with a residence time of 1 minute at 250 revolutions/minute in a DSM miniextruder (twin-screw extruder). For some of the measurements, test specimens were produced by means of injection molding (injection temperature 280° C.).

COMPARATIVE EXAMPLE 1 (V1)

Polyamide Without Silica Nanoparticles (Not of the Invention)

The polyamide from example 1 (without nanoparticles) was extruded under conditions identical with those in example 1 and processed to give test specimens.

COMPARATIVE EXAMPLE 2 (V2)

Polyamide with 1% by Weight of Silica Nanoparticles, Mixed in the Melt (Not of the Invention)

The polyamide from example 1 and the colloidal silica dispersion from example 1 were mixed in a miniextruder under the conditions described in example 1; the colloidal silica sol was introduced hot. The test specimens were then produced as described in example 1.

The size distribution of the nanoparticles in the polymer matrix was determined respectively by electron microscopy (SEM, scanning electron microscope) on the polymer mixture from example 1, and also comparative example 2. Table 1 shows the results.

TABLE 1

| Statistical function Fundamental unit | V 2 (not of the invention) | Example 1 (of the invention) |
|---|---|---|
| Number of nanoparticles checked | 1075 | 803 |
| | Diameter [μm] | Diameter [μm] |
| Average value (number average) | 2.37 | 0.49 |
| Median | 2.42 | 0.44 |
| Minimum | 0.28 | 0.14 |
| Maximum | 5.87 | 1.69 |
| Standard deviation | 0.99 | 0.28 |
| Variance | 0.98 | 0.08 |
| Average value (mass average) | 3.09 | 0.81 |

The nanoparticles in the polymer mixture produced by the process of the invention are markedly smaller than in the polymer mixture which was produced via mixing of the nanoparticles with the polymer in the melt. Application of the nanoparticles in the form of fine droplets to the polymer granules markedly reduces the extent of agglomeration of the nanoparticles to give larger particles.

Test specimens produced in example 1, V1, and V2 were used to determine tensile properties in tensile strain tests to ISO 527-2. Modulus of elasticity was determined to ISO 527-2, Table 2 collates the results. The table also shows the results of determination of intrinsic viscosity (IV) of the polyamide to DIN 53 727, on 0.5% by weight solutions in 96% by weight sulfuric acid, and melt flow index (MVR) to ISO 1133 using 270° C./5 kg load.

TABLE 2

|  | V1 (not of the invention) | V2 (not of the invention) | Example 1 (of the invention) |
|---|---|---|---|
| Polyamide [% by wt.] | 100 | 99 | 99 |
| Silica nanoparticles [% by weight] | 0 | 1 | 1 |
| Total [% by weight] | 100 | 100 | 100 |
| Production: | Extrusion | Mixing in the melt and extrusion | Atomizer and extrusion |
| IV [ml/g] | 141 | 133 | 135.6 |
| MVR [10 g/min] | 51.7 | 54.1 | 69.4 |
| Tensile strength [MPa] | 88.1 | 68.3 | 89.3 |
| Modulus of elasticity [MPa] | 2860 | 2841 | 2806 |
| Tensile strain at break [%] | 13.2 | 2.4 | 32.1 |

It is clearly seen that the polymer mixture produced in the invention exhibits markedly higher tensile strain at break than the two comparative examples, while there is practically no effect here on tensile strength in comparison with the unfilled polyamide. Melt flow index (MVR) is also markedly higher than for the unmodified polyamide, and is also markedly higher than for the polyamide which comprises nanoparticles added in the melt. The process of the invention can therefore produce polymer mixtures which comprise nanoparticles and in which the nanoparticles are present in markedly smaller form, i.e. the extent of agglomeration of the nanoparticles occurring during production of the mixtures is smaller; these polymer mixtures moreover have improved mechanical properties, and also better processability, EXAMPLES 2a AND 2b Polyamide with Polyethyleneimine (of the Invention)

The polyamide from example 1 was charged to a jacketed column. The temperature was about 170° C., and the column was flushed with hot nitrogen during the entire experiment. The ultrasound atomizer was in the middle of the column, and was used to spray the desired amount (15.6 g/h) of polyethyleneimine (molar mass $M_w$: 1300 g/mol; pH 11, viscosity at 20° C.: 20 000 Pas, Lupasol® G 20, BASF SE) in the form of solution (10% by weight in water) at a frequency of 1 MHz onto the polyamide granules. In a continuous process, 300 g of granules per hour were preheated for 1 h with nitrogen and added from the top of the column. Corresponding amounts of the granules were removed from the bottom after passage through the column and application of the polyethyleneimine solution (example 2a).

A portion of the granules was then extruded in the DSM miniextruder (twin-screw extruder) at 206° C. with a residence time of 3 minutes at 250 revolutions/minute example 2b).

The specimens from examples 2a and 2b were used to measure melt flow index, and also to determine intrinsic viscosity prior to and after measurement of melt flow index, as described above.

COMPARATIVE EXAMPLES 3a AND 3b (V3a-b)

Polyamide Without Polyethyleneimine (Not of the Invention)

A portion of the polyamide was used directly for the measurements (comparative example V3a).

A portion of the granules was extruded in the DSM miniextruder (twin-screw extrudes) at 206° C. with a residence time of 3 minutes at 250 revolutions/minute (comparative example V3b).

The specimens from comparative examples 3a and 3b were used to measure melt flow index, and also to determine intrinsic viscosity prior to and after measurement of melt flow index, as described above.

COMPARATIVE EXAMPLES 4a AND 4b (V4a-b)

Polyamide with Polyethyleneimine, Mixed in the Melt (Not of the Invention)

The polyamide from example 1 was mixed in the melt with the polyethyleneimine solution from example 2, using a twin-screw extruder at 280° C. with a residence time of 2 min. (Comparative example V4a).

A portion of the granules from comparative example 4a was then extruded in the DSM miniextruder (twin-screw extruder) at 206° C. with a residence time of 3 min. at 250 revolutions/minute (comparative example V4b).

The specimens from comparative examples 4a and 4b were used to measure melt flow index, and also to determine intrinsic viscosity prior to and after measurement of melt flow index, as described above.

Table 3 collates the results of the measurements of intrinsic viscosities and melt flow indices from examples 2a-b, and comparative examples 3a-3b and 4a-4b.

TABLE 3

|  | Constituents | Production method | Post-treatment | IV prior to MVR [mL/g] | MVR 275° C./5 kg [cm³/10 min] | IV after MVR [mL/g] |
|---|---|---|---|---|---|---|
| V3a | Polyamide | Starting polymer | none | 165 | 86.9 | 145 |
| V3b | Polyamide | Starting polymer | 3 min. in the mini-extruder at 206° C. | 145 | 150 | 130 |
| V4a | Polyamide with polyethyleneimine | Mixed in the melt | none | 117 | 185 | 123 |
| V4b | Polyamide with polyethyleneimine | Mixed in the melt | 3 min. in the mini- |  |  |  |

TABLE 3-continued

| | Constituents | Production method | Post-treatment | IV prior to MVR [mL/g] | MVR 275° C./5 kg [cm³/10 min] | IV after MVR [mL/g] |
|---|---|---|---|---|---|---|
| 2a | Polyamide with polyethyleneimine | of the invention | extruder at 206° C. none | 165.4 | 125 | 145.2 |
| 2b | Polyamide with polyethyleneimine | of the invention | 3 min in the mini-extruder at 206° C. | 165.1 | 134 | 155.2 |

Comparison of V3 with example 2 shows that in the case of the polymer mixtures produced in the invention the amount of degradation occurring is smaller (higher IV) (V3b in relation to 2b), or else while the amount of degradation is the same the melt flow index of the polymer mixture produced in the invention is markedly higher, and these mixtures therefore have better thermoplastic processability. If The polymer mixture with the polyethyleneimine is produced via mixing in the melt, a markedly higher level of degradation occurs (lower IV) than in the case of the polymer mixtures produced in the invention.

The invention claimed is:

1. A process for producing polymer mixtures comprising at least one polymer (A) and at least one component (B), comprising the following steps:
   (a) providing the at least one polymer (A) in the form of granules,
   (b) providing the at least one component (B) in the form of liquid solution and/or dispersion in a dispersion medium,
   (c) forming droplets of the solution and/or dispersion provided in step (b) with an atomizer, and applying the droplets to the granules provided in step (a),
   (d) drying the granules obtained in step (c), and
   (e) shaping the granules obtained in step (d),
   wherein the droplets produced by the atomizer in step (c) have an average diameter of from 0.5 to 10 μm, as determined by means of light scattering, and the granules are present in a fixed bed or fluidized bed in step (c), and wherein the at least one polymer (A) is selected from thermoplastic polymers.

2. The process according to claim 1, wherein the granules provided in step (a) have a $D_{50}$ value of from 5 μm to 5 mm, determined via sieving.

3. The process according to claim 1, wherein the atomizer is an ultrasound atomizer.

4. The process according to claim 3, wherein the the ultrasound atomizer operates in a frequency range of from 25 kHz to 5 MHz.

5. The process according to claim 1, wherein step (c) is carried out at a temperature of at least 10° C.

6. The process according to claim 1, wherein, in step (d), the granules are dried by passage of an inert gas stream.

7. The process according to claim 1, wherein the at least one polymer (A) is selected from a polymer produced by polycondensation.

8. The process according to claim 1, wherein the at least one polymer (A) is selected from the group consisting of polyamides, polyesters, polycarbonates, a copolymer of two or more of polyamide, polyester, or polycarbonate, and mixtures thereof.

9. The process according to claim 1, wherein said component (B) is in the form of nanoparticles and/or polymers.

10. The process according to claim 9, wherein the nanoparticles have a $D_{50}$ value of from 1 nm to 500 nm.

11. The process according to claim 9, wherein the nanoparticles are oxides or oxide hydrates of metals or semimetals.

12. The process according to claim 9, wherein the polymer is a branched or hyperbranched polymer.

13. The process according to claim 9, wherein the polymer used as (B) is polyetheramine, polyethyleneimine, polycarbonate, or mixtures thereof.

14. The process according to claim 1, wherein the dispersion medium for (B) is selected from the group consisting of water and mixtures of solvents and water with surface tension from 35 to 100 mN/m, measured at 25° C.

15. The process according to claim 1, which is carried out continuously or batchwise.

16. The process according to claim 1, wherein the at least polymer (A) is a polyamide and component (B) is silica.

17. The process according to claim 1, wherein the at least polymer (A) is a polyamide and component (B) is polyethyleneimine.

18. A process for producing polymer mixtures comprising at least one polymer (A) and at least one component (B), comprising the following steps;
   (a) providing the at least one polymer (A) in the form of granules, the granules having a $D_{50}$ value of from 5 μm to 5 mm, as determined via sieving,
   (b) providing the at least one component (B) in the form of liquid solution and/or dispersion in a dispersion medium, and
   (c) forming droplets of the solution and/or dispersion provided in step (b) with an atomizer, and applying the droplets to the granules provided in step (a),
   wherein the droplets produced by the atomizer in step (c) have an average diameter of from 0.5 to 10 μm, as determined by means of light scattering, and the granules are present in a fixed bed or fluidized bed in step (c), and wherein the at least one polymer (A) is selected from thermoplastic polymers.

19. The process according to claim 18, wherein the component (B) is in the form of nanoparticles with a $D_{50}$ value of from 1 nm to 500 nm, the nanoparticles selected from oxides or oxide hydrates, of metals or semimetals.

20. The process according to claim 18, wherein the component (B) is in the form of a branched or hyperbranched polymer, the polymer selected from polyetheramine, polyethyleneimine, polycarbonate, or mixtures thereof.

21. The process according to claim 19, wherein the at least polymer (A) is a polyamide and component (B) is silica.

22. The process according to claim 20, wherein the at least polymer (A) is a polyamide and component (B) is polyethyleneimine.

* * * * *